United States Patent [19]

Kawaguchi et al.

[11] 4,181,365
[45] Jan. 1, 1980

[54] WHEELS FOR MOTORCYCLES

[75] Inventors: Takeshi Kawaguchi, Fujimi; Yasuhisa Kobayashi, Saitama; Masayuki Onimaru, Kawagoe, all of Japan

[73] Assignee: Honda Giken Kogyo Kabushiki Kaisha, Tokyo, Japan

[21] Appl. No.: 784,053

[22] Filed: Apr. 4, 1977

[30] Foreign Application Priority Data

| Apr. 8, 1976 [JP] | Japan | 51-43487[U] |
| May 1, 1976 [JP] | Japan | 51-55235[U] |
| Jun. 25, 1976 [JP] | Japan | 51-83689[U] |
| Jul. 7, 1976 [JP] | Japan | 51-80602 |

[51] Int. Cl.² ............................ B60B 1/10; B60B 1/14
[52] U.S. Cl. ........................................ 301/67; 301/74; 301/75; 301/64 SH
[58] Field of Search ............ 301/6 V, 63 DD, 63 DS, 301/64 R, 64 SH, 67, 73, 74, 79–80, 78, 75, 62, 72, 66

[56] References Cited

U.S. PATENT DOCUMENTS

| 766,439 | 8/1904 | Gilbert | 301/104 |
| 1,099,133 | 6/1914 | Smith, Jr. | 301/63 DS |
| 1,487,904 | 3/1924 | Walters et al. | 301/64 SH |
| 2,007,444 | 7/1935 | Gannett | 301/63 DS |
| 2,372,049 | 3/1945 | Bailey | 301/38 D |

FOREIGN PATENT DOCUMENTS

| 430565 | 8/1911 | France | 301/73 |
| 683521 | 3/1930 | France | 301/63 DD |
| 512 | of 1894 | United Kingdom | 301/63 DD |
| 6201 | of 1896 | United Kingdom | 301/63 DD |
| 11217 | of 1891 | United Kingdom | 301/67 |
| 113179 | 2/1918 | United Kingdom | 301/63 DS |

Primary Examiner—Charles A. Marmor
Attorney, Agent, or Firm—Irving M. Weiner; Pamela S. Burt; Melvin Yedlin

[57] ABSTRACT

A spokeless wheel for a motorcycle or other vehicle is made by combining a wheel hub with a wheel rim through several sets of plates, wherein each set includes two opposed plates. In the vertical cross-section, the plates form an isosceles triangle with the hub forming the base of the triangle.

15 Claims, 26 Drawing Figures

WHEELS FOR MOTORCYCLES

This invention relates to wheels for vehicles.

More particularly, the invention relates to a wheel to be used primarily for autobicycles or motorcycles wherein a wheel rim and hub are combined with each other through a plurality of sets of two plates each divided in the direction of an axle instead of spokes, so that the wheel may be simplified in structure and assembly, improved in appearance, and reduced in cost while remaining strong and rigid.

BACKGROUND OF THE INVENTION

Heretofore, wheels used for motorcycles have been generally of a type wherein a rim and hub are combined with each other through spokes.

Such spoke type wheel require so many spokes that the number of component parts including fitting members to the rim and hub of each wheel, is great. The number of steps of assembling spokes is great and the assembling requires many manual operations, many workers, and much time. Further, the workers must be skilled. Because the spokes are to support the rim and hub with the tension and compression of wire materials, each spoke is required to be assembled with a substantially uniform fastening force and is difficult to assemble and balance. Therefore, there are so many steps in manufacturing such wheels that it is difficult to save labor, the number of component parts is so great that the wheel is costly, and there are problems in reducing the cost of the wheel or of the motorcycle.

In the spoke type wheel, because the spokes are fastened and combined, they will become loose, and thus special tools are required to tighten them. It is necessary to tighten them by considering the balance of the whole, and great skill is required for such tightening work.

A disk type wheel has been used wherein, as in an automobile, spokes are eliminated. The rim and hub are combined with each other through a disk, or the rim and disk are made integral with each other and are combined with the hub, but this also results in many problems.

When used as a wheel for motorcycles, this type of wheel is exposed on both surfaces and the disk may not have a good appearance, will appear to be dull, will be heavy, and will result in various problems if the disk is used, the weight of the wheel will be high. In case the wheel is used for a front wheel or the like, the steering will not be light. In view of the above, a disk could be punched to reduce the weight and to improve the appearance. However, as the disk is punched and cut, the material will be wasted. This will not be desirable in saving the material resources. Particularly, on a motorcycle, the wheel is so important to the appearance and design of the entire vehicle that it is necessary to use a material good in appearance and high in cost and treated on the surface by plating.

SUMMARY OF THE INVENTION

The present invention provides a wheel for a vehicle, which wheel includes a wheel hub, and a wheel rim having a projection on its inner surface. At least one set of plates mechanically and operably connects the wheel hub to the rim projection. The plates, the wheel hub and the rim projection form in a vertical cross-section triangle having the rim projection at the apex of the triangle, and the base of the triangle being formed by at least a portion of the wheel hub.

An object of the invention is to provide a wheel for a vehicle wherein a rim and hub are combined with each other through plates so as to be a spokeless wheel, and so that the various problems of spoke type wheels and disk type wheels are avoided.

An object of the invention is to provide a practically excellent wheel which is simpler in structure and assembly and much lower in the number of component parts than a spoke type wheel, is easy to produce, is much better in appearance and design than a disk type wheel, is effective to save material, can be made high in strength without impairing appearance, and can be inexpensively manufactured.

Particularly, an object of the invention is to provide a wheel wherein a projection is provided on the inside diameter portion of a wheel rim, and two plates in each set are joined with each other, opposite to each other, on opposite surfaces, of the above mentioned projection, and on both surfaces of a hub so as to combine the rim and hub with each other. A plurality of sets of two plates each are arranged on the periphery, and the plates of each set are made to have a small fitting distance on the rim side, but large on the hub side. The plates are combined to form an isosceles triangle in their vertical cross-section in the direction of the axle, with the apex on the rim side and the base on the hub side.

An object of the invention is to provide a wheel which is spokeless, and made by combining a rim and hub with each other by a plurality of sets of two plates each opposed to each other to form an isosceles triangle in their vertical cross-section in the direction of the axle, with the apex on the rim side and the base on the hub side, forming a wheel which is stronger in vertical rigidity, vertical load strength, horizontal rigidity, and horizontal load strength than a disk type wheel.

A further object is to provide a wheel including a rim wherein a projection is provided in the form of a ring over the entire periphery of the inside diameter portion and is adapted to be used as a plate fitting member so as to increase the strength and rigidity of the rim, while making the rim lighter.

A further object is to provide a wheel including a structure for combining plates with a projection of the inside diameter portion of a rim wherein plates are combined with tapers on both sides of a projection formed by extruding and shaping the inside diameter portion of a rim by inserting and providing tapered washers between each plate and the projection so that axes of such combining members as rivets may conform to the axis of the wheel to make the combination of the plates strong and positive.

A further object is to provide a wheel including a combining structure wherein plates are formed at the fitting ends, so that the center line of each plate is intersected at the intersection of the combining member with each side surface of the projection, to support the load in the lateral direction acting on the projection of the inside diameter portion of the rim and to improve the rigidity and strength of the joint between the projecton of the inside diameter portion of the rim and the plate.

An object is to provide a wheel including a combining structure wherein both sides of a projection of the inside diameter portion of a rim are tapered. The joining part of a plate to the side of the projection is bent to conform with the tapered surface to be joined with it. When the plate and projection are combined with each other through rivets, this reduces the shearing stress and prevents stress concentration in the rivet, and improves the rigidity and strength of the combining part so that the opening angle between the plates of a set of two plates may be made small.

A further object is to provide a wheel wherein combining members for plates with a projection of the inside diameter portion of a rim are covered with a cover to protect and shield the combining part, and to improve the appearance and design.

A further object is to provide a wheel including a combining structure wherein a part a plate which joins with a projection of the inside diameter portion of a rim is bent outwardly at tne end. The bent part is contacted with the inside diameter portion of the rim on each side of the projection to improve rigidity and strength of the wheel in the vertical and peripheral directions.

A further object is to provide a wheel including a structure for combining plates wherein combining parts at both ends of a fitting part of a plate to a hub are formed to overlap those of the adjacent plate, so that they may be combined through a single combining member, such a bolt, to allow increasing the span of the members combining the plate with the hub, to improve rigidity and strength of the combining part, to reduce the number of component parts, to reduce the combining steps, and to improve the ease of assembly.

Another object is to provide a wheel including plates wherein a groove or rib is provided in the lengthwise direction of each plate to improve the strength and rigidity of the plate. A through hole with the peripheral part raised is made in the lengthwise direction of the plate to increase the strength and rigidity of the plate and allow the forming of a bend in the width direction of the plate to improve the appearance and design.

An object is to provide a wheel including a structure wherein one of the fitting holes made in an end portion of each plate is arranged as a positioning hole with precision. The other holes are formed as loose holes for the combining members to efficiently allow a precise plate assembling step, and to simplify the manufacture of the wheel.

A primary object is to provide a wheel formed by combining a rim and hub with each other through a plurality of sets of two plates each to define an isosceles triangle with the apex on the rim side and the base on the hub side in the vertical cross-section in the direction of the axle.

The cross-sectional area of the plate, opening angle between the plates, number of sets of plates, length of the plate, and thickness of the plate material are so selected that the rigidity coefficient of the plate may be greater than a specific range. The thickness of a projection on the inner diameter portion of the rim is made to be in a specific range so as to make the combination of the rim and hub through the plates so strong as not to be loosened by vibrations or the like while running. With respect to the steering stability of a motorcycle, in the convergence of external disturbances, such as vibrations, received by the wheel from a road surface, the rim and hub are combined through the plate to subject one of the plates of the set to tension, and the other plate to compression to retain the strength and rigidity of the wheel while providing the steering characteristics of a spoke type wheel.

BRIEF DESCRIPTION OF THE DRAWINGS

FIG. 7 is a sectioned view of a combining part for explaining a problem in the case of combining a plate with a projection of the inside diameter portion of a rim by rivets or the like.

DETAILED DESCRIPTION

Figures 1, 2:
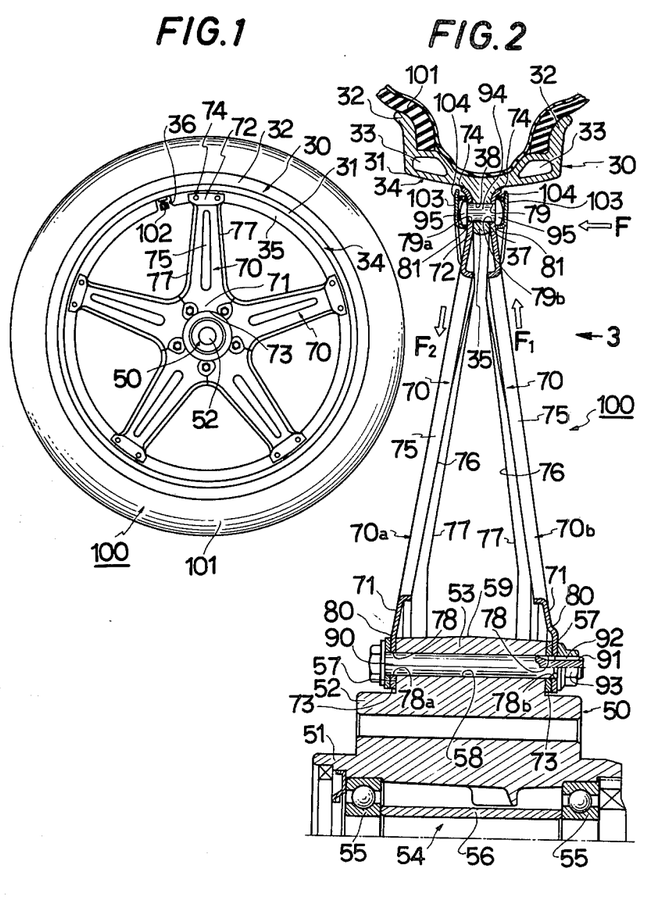
FIG. 1 is a side view schematically showing a wheel according to a first embodiment of the invention.
FIG. 2 is a vertically sectioned view in the axial direction of the FIG. 1 wheel, only a half of the wheel being magnified.
Figure 3:
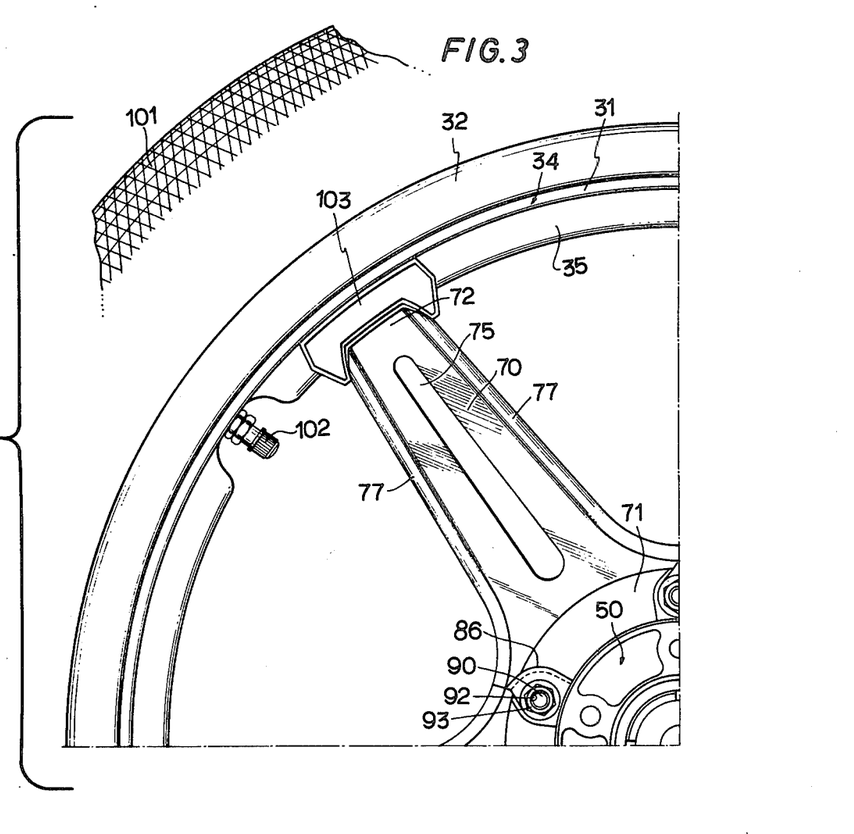
FIG. 3 is a view seen in the direction indicated by arrow 3 in FIG. 2, showing only essential parts.

FIGS. 1 to 3 show a fundamental structure of a wheel according to the invention.

A wheel 100 comprises a rim 30, two plates 70, and a hub 50.

Rim 30 is shaped by extruding or rolling an aluminum alloy or the like, and is formed to be ring-shaped. Rim 30 is provided with a substantially flat body 31 parallel with the axis of an axle, and ear pieces 32 erected on the outer periphery on the right and left, respectively, of body 31 integrally shaped to be ring-shaped. Spaces 33 (FIG. 2) are provided on the right and left over the entire periphery within body 31 to make body 31 thick and light, yet improved in strength.

A projection 35 of a small width projects from the inside diameter of the rim 30 in the central part in the width direction, i.e., toward the center of the wheel, and centered on rim 30. Projection 35 is integral with body 31. A number of such projections 35 may be provided in inside diameter portion 34 of the rim. But preferably, projection 35 is provided to be ring-shaped over the entire periphery of portion 34. Projection 35 provided over the entire periphery acts as a rib to improve the strength in the inside diameter portion, and improves the rigidity and strength in the vertical direction of rim 30. A part of projection 35 is cut at 36 to accommodate an air valve 102 of a tire.

Each set is formed of two plates 70. Plates 70 are symmetrical. A plurality of such sets are prepared. Plate 70 is a press-shaped product of a steel plate material. Because the wheel is exposed on an autobicycle or motorcycle, in consideration of anticorrosion and appearance, it is preferred that the plate be of a stainless steel plate material of a good appearance, or a steel plate material treated on the surface by plating.

Figure 13:
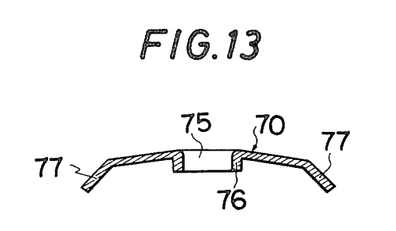
FIG. 13 is a cross-sectional view of a plate.

Plate 70 shown in FIGS. 1 to 3 is shaped as shown in FIG. 13. The plate is formed to be wide in its base part 71 on the hub fitting side, and to be narrow in its tip part 72 on the rim fitting side. In the illustrated embodiment, plate 70 is curved to be wider at base part 71, is linearly tapered toward tip part 72 from the curved base part, and is formed to be somewhat wider in part 72 so as to be a fitting part. The inner peripheral edge 73 of part 71 is formed to be arcuated with the same curvature as the outer peripheral surface of the arcuated stepped part 52 of the intermediate portion of hub 50. The outer peripheral edge 74 of part 72 is arcuated with the same curvature as to the inner peripheral surface of portion 34 of rim 30.

In FIGS. 1 to 3, plate 70 has a through hole 75 formed in the lengthwise direction in the intermediate portion in the width direction to lighten it. As shown in FIG. 13, a rib 76 is formed by raising the peripheral edge part of the entire inner periphery of hole 75 toward the back surface. Both edge parts 77 of plate 70 are also bent toward the back surface side to increase rigidity and strength of the plate and to improve the design, together with rib 76.

Figure 14:
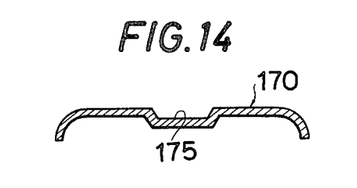
FIG. 14 is a cross-sectional view showing another embodiment of a plate.
Figure 15:
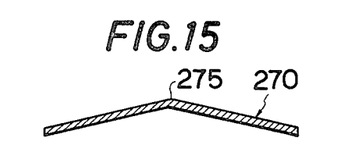
FIG. 15 is a cross-sectional view showing another embodiment of a plate.
Figure 16:
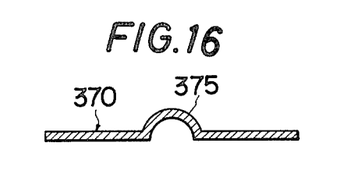
FIG. 16 is a cross-sectional view showing still another embodiment of the same.

The cross-sectional shape of plate 70 can be selected from the various embodiments shown in FIGS. 14 to 16. In FIG. 14, a concave groove 175 is formed in the intermediate portion of a plate 170, and both edge portions of the plate are curved toward the back surface. In FIG. 15, a plate 270 is V-shaped in cross-section, and is provided with an edge 275 passing radially through the intermediate portion. In FIG. 16, a flat plate 370 is provided with a semicircular rib 375 on the front surface in the central portion.

The cross-sectional shape of plate 70 is determined by taking the required vertical and horizontal rigidity and strength of the plate into consideration.

As shown in FIG. 2, hub 50 has three stepped parts which are different in width. Hub 50 has the intermediate arcuated stepped part 52 which is narrower than the body 51, and is wider than an outer peripheral part 53. An axle inserting hole 54 is made through the center of body 51. Bearings 55 are fitted in both end portions within body 51, and a collar 56 is fitted in the intermediate portion.

Body 51 and the stepped parts 52 and 53 of hub 50 are formed circular and concentric. Both surfaces 57 of part 53 are perpendicular to the axis of the wheel, and flat to form seat surfaces for fitting parts 71 of plates 70.

Plates 70 of each set are symmetrically opposed to each other. Fitting holes 78 are formed in the parts near both ends of part 71. An inserting hole 58 is made between both end surfaces 57 through part 53. A bolt 90 is passed through hole 58 from the hole 78a of one plate 70a to the hole 78b of the other plate 70b fitted on the other side. A nut 93 is screwed on bolt 90 to fasten plates 70a and 70b. A groove 91 is made in the end portion of bolt 90, and a dowel pin 92 is pressed into groove 91 to prevent the nut from loosening.

Tip parts 72 of plates 70 are contacted with both surfaces of projection 35. Inserting holes 38 passing through both surfaces 37 are provided in projection 35. Part 72 of each plate is provided with corresponding fitting holes 79 near both ends. A rivet 94 is passed through the hole 79a of one plate 70a, the hole 38 of the projection 35, and the hole 79b of the other plate and is pressed to bind parts 72 of the plates 70a and 70b to both side surfaces of projection 35.

Rim 30 and hub 50 are thus combined with each other through the sets of plates 70. As shown in FIG. 2, in this combined state, the wheel 100 is narrow at the project 35, but is wide at the hub. Therefore, plates 70 are bent at 80 and 81. Because each plate is provided with bends 80 and 81, even if the widths of projection 35 and part 53 are very different from each other, the tip parts 72 and base parts 71 will conform to the fitting surfaces 37 of projection 35 and the fitting seat surfaces 57 of stepped part 53.

Sets of plates 70 are combined with the rim and hub to be in the form of an isosceles triangle in which the apex is on projection 35, the base is the outer peripheral portion 59 of the outer peripheral stepped part 53 of the hub, and the two equal sides thereof are formed by the plates 70 as shown in FIG. 2. The plates, five sets in the illustrated embodiment, are radially arranged.

Because the plates 70 in sets are combined to form an isosceles triangle with the apex on the rim side and the base on the hub side, a load from a road surface will act on rim 30, plates 70 and hub 50 through a tire 101 fitted to rim 30. In case a lateral load F acts on the combining part of the wheel, one plate will be subjected to a tensile force $F_1$ but the other plate will be subjected to a compressive force $F_2$. The lateral load F will not act on the plates as a bending force as it would if the plates were disposed to be parallel. According to the invention, sufficient lateral rigidity and lateral load strength is obtained, and an effective wheel of great strength is obtained. Even if the thickness of the plate is reduced, a sufficient strength is obtained. Therefore, the plate can be made thin and light. Even if the plate is simplified in shape and is provided with lightening slots or holes, lateral rigidity and lateral load strength sufficient for a wheel is obtained, so that there is freedom to select the design, and a favorable wheel design can be selected. Particularly, the wheel for autobicycles is so large in diameter and so narrow in width as to require high lateral load strength and lateral rigidity, which can be obtained according to the structure described above.

Wheel 100 is a front wheel for motorcycles. The rear wheel is the same, but is somewhat modified in the structure of the hub allow attachment of a part such as a driving sprocket.

In FIG. 1, the combining part of the plate and rim, i.e., the rivet combining part is shown as bare. The rivet head is exposed on the outside of the plate. Therefore, as shown in FIGS. 2 and 3, a cover 103 is fitted to crown and shield the rivet head 95 for a decorative effect. Cover 103 is a metal or plastic plate which may indicate a trademark on the surface, and is provided on its back surface with a holding piece 104 fitting rivet heads 95. Piece 104 is wide enough to crown both rivet heads in the end parts, and is applied coated with an adhesive in advance to being pressed into place. Cover 103 is thus secured to rivet heads 95 to shield them from the elements. Thereby, the combining part is protected and its appearance is improved.

Figure 4:
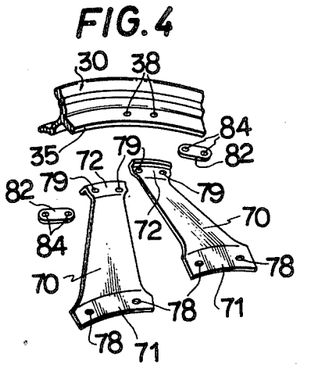
FIG. 4 is a disassembled perspective view schematically showing another embodiment combining the tip part of a plate with a projection on the inside diameter portion of a rim through a washer.
Figure 5:
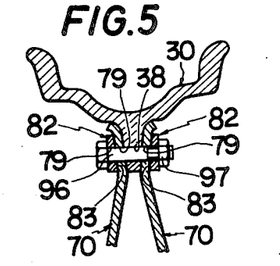
FIG. 5 is a sectioned end view showing the FIG. 4 combination.
Figure 6:
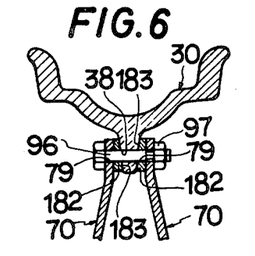
FIG. 6 is a view of a modification of FIG. 5.

FIGS. 4 to 6 show a combining structure of parts 72 with projection 35. At the time of extruding and shaping projection 35, the parallelism of both surfaces 37 is difficult to maintain, so that it may be easier to make these surfaces as tapered surfaces. Projection 35 will be wider in its base part on the inside diameter of the rim, but narrow on the tip side. When riveting the plate to the rim, the rivets will be able to distort in comformity with such tapers due to the plastic deformation of the rivets. But, when combining them through bolts and nuts instead of rivets, the tapers are not desirable, since there are no seat surfaces vertical to the bolt heads and nuts. Therefore, if mechanical work is needed to maintain the parallelism of both surfaces of projection 35, the cost will be increased and the number of steps involved in producing wheels will increase.

In the invention, the problems in combining the plates with the projection of the inside diameter portion of the rim using bolts and nuts are solved as follows.

A washer 82 having on its back surface a tapered surface 83 corresponding to the tapered surface on each surface 37 is prepared for each plate. Washer 82 is provided with holes 84 conforming to fitting holes 79. The tip parts of plates 70 are contacted with both surfaces 37. Washers 82 are contacted with the plates from outside. A bolt 96 is passed through a hole 84 in one washer 82, the fitting hole 79 in the tip part of plate 70, and the fitting hole 38 in the projection 35. Another bolt 96 is passed through the respective holes on the other side, and nuts 97 are screwed to the bolts 96 to fasten the plates. In this manner, a flat and parallel seating surface is obtained. This is shown in FIG. 5.

FIG. 6 shows an embodiment wherein the washer is inserted between the plate and projection. Tapered surfaces 183 on the backs of washers 182 are in contact with surfaces 37. Fitting seat surfaces are formed on the outside surfaces of washers 182. The back surfaces of parts 72 are contacted with the outside surfaces of washers 182. Bolts 96 are passed through the holes 78, 184 and 38 and are fastened with nuts 97 from the other side. Thus, vertical fitting seat surfaces can be obtained. The combination by bolts and nuts has been explained above, but rivets may also be used.

FIGS. 7 to 12 show problems of bending loads in the plate combining part of a wheel, and means of preventing bending according to the present invention.

Figure 7:
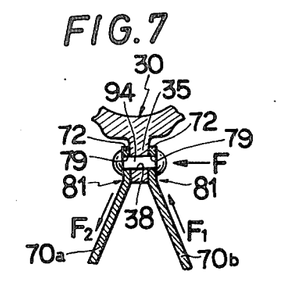

Sets of two plates each are combined with the rim and hub in the form of an isosceles triangle, with the apex on the rim side, and the base on the hub side. As shown in FIG. 7, parts 72 are contacted with both surfaces of projection 35. The distance between the plates on the hub side is larger, so that outward bends 81 are made in the base parts of parts 72. Parts 72 are riveted by passing rivets 94 through holes 79 and 38.

In such combination, when a lateral load F acts on the wheel, one plate 70b will be subjected to a tensile force $F_1$ but the other plate 70a will be subjected to a compressive force $F_2$. The forces $F_1$ and $F_2$ will not act on the centers of the fitting seat surfaces of the combining parts, but will act on bends 81. As a result, lateral load F will act as a bending load on such parts to reduce lateral rigidity. This is the same also in the fitting parts on the hub side. Thus, a bending load on such parts results in plastic deformation of parts, unbalance of the wheel, and instability in operation.

According to the invention, the center line of the plate is intersected at the intersection of the plate combining part with the axis of the rivet to increase the lateral rigidity and solve such problems.

Figure 8:
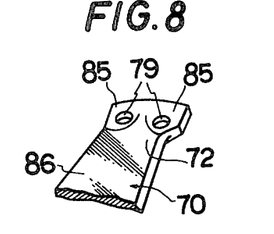
FIG. 8 is a perspective view of an improved fitting part of a plate for the FIG. 7 projection.

As shown in FIG. 8, fitting parts 85 having holes 79 are provided on the right and left of the tip part of plate 70 by press-shaping, and are shaped so as to form surfaces perpendicular to the axis of the wheel, on both sides of projection 35. The area between fitting parts 85 is not press shaped. The remainder of part 72, continued linearly with the intermediate portion 86, is bent so that its center line may substantially intersect the center line of hole 38.

When parts 72 are butted to both surfaces 37 and are combined with the projection through rivets 94, the center lines $N_1$ (FIG. 9) in the lengthwise direction of plates 70 will intersect the center lines $N_2$ of the bolts 94 at their intersections with surfaces 37.

Figure 9:
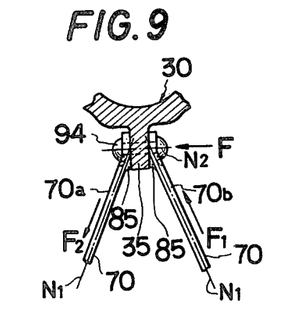
FIG. 9 is an explanatory sectioned view showing the FIG. 8 improved fitting structure.

When a lateral load F acts on the wheel, one plate 70b will be subjected to a tensile force $F_1$, but the plate 70a will be subjected to a compressive force $F_2$. Forces $F_1$ and $F_2$ will act on the intersections of the axes of the rivets 94 with the seat surfaces of parts 85, but will not act as bending loads on plates 70a and 70b. Lateral load F will act only as compressive and tensile forces on plates 70a and 70b.

The combining part on the rim side has been detailed in the above. In the combining part on the hub side, the center lines of the plates are intersected at the intersections of the axes of bolts 90 with hub fitting seat surfaces 57 so that the tensile force and compressive force applied to the plates will not act as bending forces, and thus a wheel having excellent lateral rigidity and lateral load strength is obtained.

Figure 10:
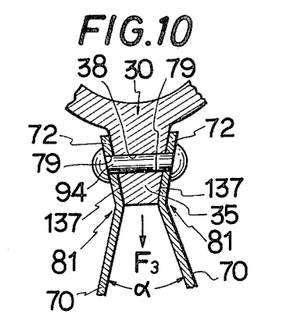
FIG. 10 is an explanatory view of a combining structure made to reduce the shearing stress and to prevent stress concentration in the rivet.

FIG. 10 is an explanatory view showing a method of reducing the shearing stress of rivets in the case of combining plates with a rim by rivets. When the joining surfaces of the plates with the projection are vertical to the axle and to the axes of rivets 94, the load on the wheel will act directly as a shearing force on the rivets. To compensate for this, it would be necessary to make the diameters of the rivets larger to increase the strength. Thus, it will become necessary to enlarge the cross-sectional area of projection 35, and the thickness of the plate. The weight of the wheel will increase and the weight of the component part will increase making the assembling work more difficult. In addition to the above, in forming the plates to form an isosceles triangle the opening angle with the apex on the rim side of the plates is an important element in determining the rigidity of the wheel.

In consideration of the above, the invention is formed as in FIG. 10.

Projection 35 is formed to be wide in its base part and to be narrow in the direction of the wheel center, forming symmetrical tapered fitting seat surfaces 137. Parts 72 of plates 70 are bent in their base parts to conform to surfaces 137. This bent tip part 72 is butted to surface 137, and rivet 94 is inserted through holes 38 and 79 to combine part 72 of each plate 70 with projection 35.

Rim 30 will be subjected to such compressive load in the vertical direction as indicated by arrow $F_3$. Because the cross-section of projection 35 is a trapezoid, the load applied to this projection will act as a vertical load on surface 137, and thus a reduced force will act as a shearing force on rivet 94. Therefore, the force acting on rivet 94 will be dispersed on the tapered seat surface, and the shearing force applied to the rivet will be greatly reduced.

Further, the opening angle of plates 70, which is an element important to determine the rigidity of the wheel, can be made as small as desired.

Figure 11:
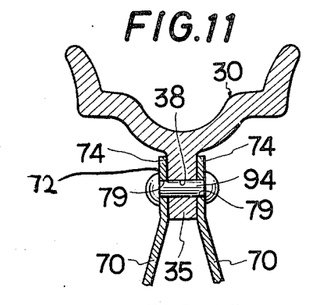
FIG. 11 is a sectioned view of a combining part for explaining another problem in the combination of a plate with a projection of the inside diameter portion of a rim.
Figure 12:
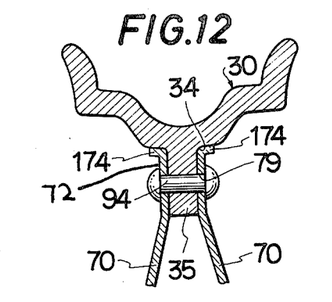
FIG. 12 is a view similar to FIG. 11, showing an improvement according to the invention.

FIGS. 11 and 12 respectively show problems in the vertical load, and a combining structure according to the invention in which they are solved.

As shown in FIG. 11, parts 72 of plates 70 are contacted with both sides of projection 35, and are riveted by inserting rivets 94 to laterally pass through them. The load in the peripheral direction when running will act on rivets 94. The stress will be concentrated in the rivet and will act as a shearing force on the rivet. If it is met with an increase of the diameter of the rivets, such problems as described above will be produced. Further, as shown in FIG. 11, both function and appearance may be impaired. The outer end 74 of part 72 will become clogged with mud or the like, and will be peeled outwardly due to minor flexing in the wheel and minor movement of the joint.

As shown in FIG. 12, the outer end of part 72 is bent outwardly to conform to the surface 34 of the inside diameter portion of rim 30 and to form a flange part 174. In combining part 72 with projection 35 by rivets 94, the outer end surface of part 174 is joined with the inside diameter surface 34.

By the above, the load on rim 30 will act on the rivet combining part and on part 174. The load in the vertical direction will be transmitted to the combining part of the plate and the contact surface of the flange part with the inside diameter of the rim, and the stress concentration on rivet 94 will be reduced. Also, the load in the peripheral direction will be reduced the same by the surface contact of part 174, and the rigidity and strength of the combining part of the plate with the projection, and that of the entire wheel, will be improved. Due to the surface contacts of part 72 with the side of projection 35 and of part 174 with the inside diameter portion surface of the rim, even when a surface pressure is locally received by a rivet or the like, there will be no deformation.

In the above, because the combining structure of an isosceles triangle type is adopted, when a lateral load acts on the wheel, one plate will be subjected to a tensile force, and the other plate will be subjected to a compressive force. Because each plate is in surface contact also in the vertical direction as mentioned above, the load will be dispersed and local stress concentrations will be prevented. Peeling and floating up of the tip of the plate will not occur, the appearance will be good, and clogging of the combining part with mud or the like will be prevented.

The tip part of the plate is bent substantially orthogonally in the above illustrated embodiment, but it may be curved outwardly as shown in FIG. 2.

In the foregoing embodiments, each plate 70 is combined in four places; two places on the right and left sides of projection 35, and two places on the stepped part 53 of hub 50. It is difficult to keep the precision of alignment of holes 38 and 58 in the rim and hub, and of 78 and 79 on the plate side good. If such precision is kept good, the workability and assemblability is improved.

Figure 17:
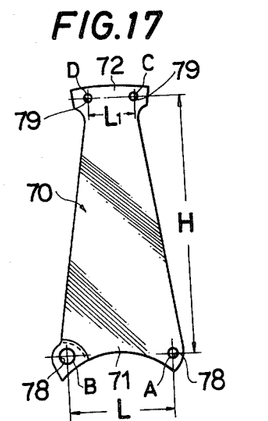
FIG. 17 is an explanatory view to show a fitting structure of a plate.
Figure 18:
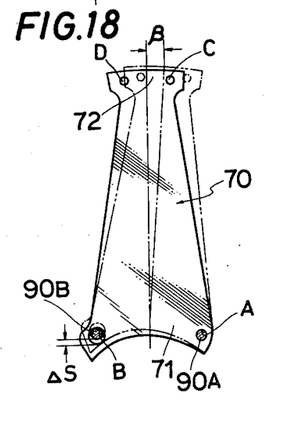
FIG. 18 is an explanatory view showing a regulation at the time of fitting the FIG. 17 plate.

FIGS. 17 and 18 show structures in which the ease of fitting of the fitting plates to a hub according to the invention is improved.

One hole, for example, hole A of holes A and B, which are the holes 78, separated from each other by a span L in the base end fitting part 71, is formed to be precise in diameter as a positioning hole so that its inside diameter may closely fit the outside diameter of bolt 90. The other hole B is made a loosely fitting hole by retaining a clearance between bolt 90 and hole B up to a predetermined limit required for combinability and precision of the product. The fitting holes 79, or C and D, on the right and left of fitting part 72 in the tip part are formed to keep a span H in the lengthwise direction with respect to holes A and B, and separated from each other by a span $L_1$ in the width direction. Holes C and D are set to be of an inside diameter larger than the outside diameter of rivets 94, and are made loosely fitting holes the same as mentioned above.

The plate 70 is combined with the rim and hub as follows. As shown in FIG. 18, first a bolt 90A is inserted through the positioning hole A and is combined with the hub 50 side. Then a bolt 90B is inserted through hole B. A clearance $\Delta S$ will be generated between bolt 90B and the inside diameter of hole B. Plate 70 is pivotally moved with bolt 90A as a fulcrum within the range of clearance $\Delta S$. As a result, the fitting part 72 will be movable within the range of the angle $\beta$, will be able to easily match holes 38 provided at the same span in projection 35, and the rivets will be able to be easily inserted through the fitting holes to rivet the plate.

Because the range of clearance $\Delta S$ is set as above mentioned and the tip part is made rotatable in the rotating direction, the error in the radial direction, i.e., in the direction H, will be as small as possible, the precision of the component parts will be maintained, and assembly will be made easy and simple. When plate 70 is press-shaped and holes A, B, C and D are shaped, if only one hole is made to maintain the precision and the other holes are made loosely fitting, in fitting the plate to the rim and hub, the positions of the fitting holes will be easily adjusted and conformed while maintaining precision. Thus the assembly of the plate and wheel is improved favorably to mass-production of wheels.

A combining structure of the plates with the hub will be explained with respect to FIGS. 19 to 22. Plates 70 are combined with hub 50 by providing the fitting holes in two places on the right and left of part 71. There will be a gap between adjacent plates, and a span between the adjacent bolts 90 through adjacent plates. Therefore, strength and rigidity will be less than desired. If possible, it is preferable to increase the strength and rigidity by setting the span between the combining places, L, to be as long as possible. Also, as each plate is fastened in two places on the hub side, the number of the bolts will be double the number of the plates. This is not advantageous to the weight. And, the fewer the fastening places, the more advantageous the assembly.

Figure 19:
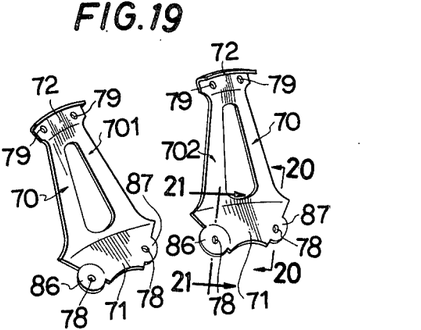
FIG. 19 is a disassembled perspective view of a plate, showing a fitting structure in which the fitting part of a plate to a hub is improved.
Figure 20:
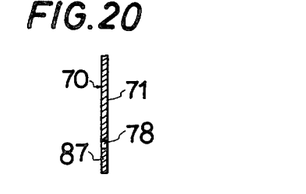
FIG. 20 is a magnified sectioned view on line 20—20 in FIG. 19.
Figure 21:
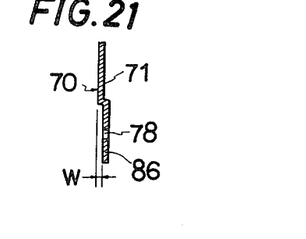
FIG. 21 is a magnified sectioned view on line 21—21 in FIG. 19.

The fitting parts 86 and 87, having the fitting holes 78 provided on the right and left, at spaced-apart edge portions of part 71 are expanded sidewise so that holes 78 may be formed on the boundaries between the expanded fitting parts 86 and 87. In the illustration, parts 86 and 87 are expanded to be semicircular. The fitting part 86 on one side is made a stepped fitting part stepped in the direction of the outside surface of the plate, in the form of a circle expanded from the sides of part 71. The amount of the step of part 86 on the plate surface is a height W, equal to the thickness of plate 70. Part 87, on the other side, is made flat so that the stepwise expanded part of the fitting part 87 may overlap the stepped part of part 86, and the overlapped back surface will be flat.

Figure 22:
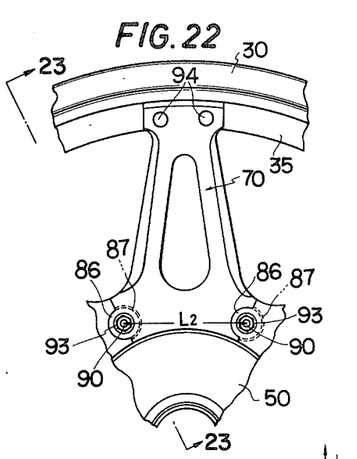
FIG. 22 is an explanatory view of a combination of a rim and hub through an improved fitting structure.
Figure 23:
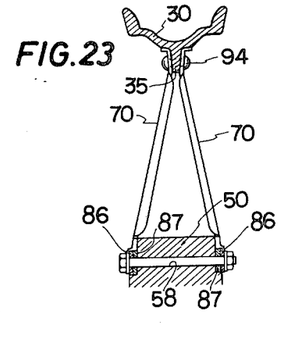
FIG. 23 is a schematic sectioned view on line 23—23 in FIG. 22.

In the combination of plates 70 with the hub, parts 87 and 86 of one plate 701 and the other plate 702 are overlapped on each other, the expanded part of part 87 fitting beneath the stepped part of part 86 to align holes 78 with each other. Bolt 90 inserted through hole 58 provided in stepped part 53 of hub 50 passes through holes 78 and is fastened with a nut. The other fitting part and the opposed fitting part of the next adjacent plate will be in the same relation. The overlapped fitting parts are combined with each other by the bolt and nut. The base parts of the adjacent plates are fastened with one bolt in common, and all the plates to be assembled on the periphery of the hub are thus combined with the bolts in common. The combined state is shown in FIGS. 22 and 23.

Because each plate is combined with the adjacent plate through one bolt in common by overlapping the right and left end parts on the hub fitting side of the respective plates as in the above, the span $L_2$ between the combining parts is longer. Because the plates are not independently combined, the span between the combining parts will not vary and the plates will be fitted to the hub with a long and equal combining span.

Because the bolts on the hub side are used in common, the number of the bolts will be half the number of the combining parts, so the assembly work will be simplified, the weight of the wheel will be reduced by the decrease of the component parts, and the cost of the wheel will also be reduced. In this manner, as the base part of each plate is fastened in two places at both ends, it will be combined strongly and stably without impairing the strength of the combining part, and the span between the combining parts, $L_2$, will be made as large as possible, and the strength and rigidity of the wheel will be increased without using any additional reinforcing member or modifying the structure of the wheel.

A preferred embodiment of the invention is explained in the following.

The wheel according to the invention may be used specifically for motorcycles. The damping of the oscillation when the wheel is subjected to external disturbances from a road surface, which is an important factor in the steering stability of a motorcycle, shall be explained.

A road may be thought to be flat at a glance but, in fact, there are various external disturbance factors on the road and the motorcycle running on the road is always subjected to them. How quickly the motorcycle absorbs such external disturbances is an important factor.

Figure 25:
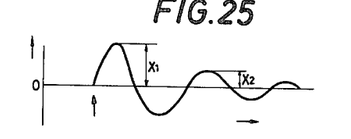
FIG. 25 is a graph showing a convergence of a steering angle of a steering handle of a motorcycle.

When a motorcycle running at any speed is subjected to an external disturbance, i.e., caused by shaking of the steering handle, the convergence of the subsequent steering angle, i.e., the effective angle of the steering handle, is graphed in FIG. 25. In the graph in FIG. 25, the abscissa indicates time, and the ordinate indicates the steering angle of the steering handle.

In order to evaluate the convergence, a logarithmic attentuation rate d is determined as represented generally by the following formula:

$$d = \log(x_1/x_2)$$

where
$x_1$ is the size of the steering angle for a first time, and
$x_2$ is the size of the steering angle for a second time.

This attenuation rate is influenced by the position of the center of gravity, and the characteristics of the motorcycle, but the element of the rigidity of the wheel is a major factor.

On the basis of various experiments, the rigidity coefficient f of the wheel, influencing the attenuation rate, can be determined from the following empirical formula:

$$f = K \frac{n A \sin^2 \frac{\theta}{2}}{l}$$

where the respective symbols are as follows:
n: Number of set of a pair of plates each.
A: Average cross-sectional area per plate.
$\theta$: Opening angle of load acting lines.
l: Length of the plate.
K: Constant of the plate material, which is K=1 when the material of the plate is an iron series, and K=0.61 when the material of the plate is an aluminum series.

Figure 26:
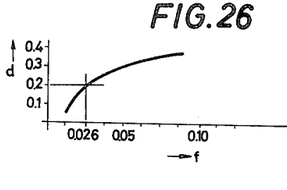
FIG. 26 is a graph showing relative characteristics of rigidity and attenuation rate.

As a result of testing on various motorcycles, the relation between the rigidity coefficient f and logarithmic attenuation rate d has been established and, the characteristic shown in the graph in FIG. 26 has been determined.

As shown in the graph, when the rigidity coefficient f is above 0.026, the value of d will be comparatively constant, but when f is below 0.026, the value of d will quickly decrease. When the value of d is below 0.2, a very unstable state exists and, in the worst case, the motorcycles will tumble.

The wheel according to the invention is formed to have a rigidity coefficient above 0.026. The fundamental structure of the wheel according to the invention is as already described, and schematically shown in FIG. 24; the tip parts of a pair of plates 70 are riveted to the right and left side surfaces of projection 35 with rivets 94, and the base parts of plates 70 are fastened to hub 50 by bolts 90 to form, in the vertical cross-section through the axle of the wheel, an isosceles triangle with the apex on the rim side and the base on the hub side.

Figure 24:
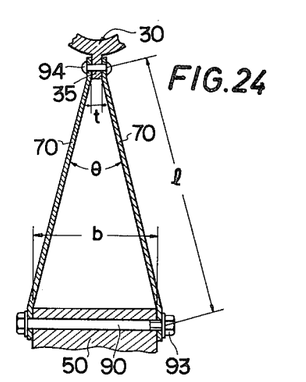
FIG. 24 is a schematic explanatory view shown to explain the setting of preferable conditions of a wheel according to the invention.

Therefore, in FIG. 24:
l: Length of plate 70.
t: Thickness of projection 35 of the inside diameter portion of the rim.
$\theta$: Opening angle of load acting lines, i.e., the plates 70.
b: Width, i.e., the width of the fitting part of hub 50. As the length l of plate 70 is naturally determined by the kind of vehicle, the number n of the sets of plates 70 and thickness of plate 70 are selected on the basis of required strength. As it is desirable to set the opening angle θ of the plates, which is a factor in to the rigidity coefficient f, to be as large as possible, the thickness t of projection 35 is selected as follows.

Usually the width b of the axle part of hub 50 is limited due to the space required for fitting the brake drum, brake disk, and driving system, such as the sprocket, and is limited to be 90 mm. at most.

Under such circumstances, as a result of experiments on the relation of thickness t with the opening angle θ of plates 70, the maximum thickness t of projection 35, where the desired rigidity coefficient f can be obtained, is 14 mm.

It is preferable that the thickness t of projection 35 be smaller, but the minimum value is determined by the strength required of the projection. The factor determining the strength is the impact force in colliding with a vertical curbstone. If the rigidity of the rim alone is considered, the minimum value of the thickness t will be 4 mm.

Therefore, the thickness t of projection 35 may be freely selected between $4 \leq t \leq 14$.

When the rigidity coefficient f of the above mentioned wheel is made $f > 0.026$, and the thickness t of projection 35 is made $4 \leq t \leq 14$, a wheel of excellent rigidity and strength is obtained.

By forming the invention as in the above, the rigidity, which is an important element in the steering stability of the motorcycle can be kept above the desired value, external disturbances received by the wheel during running can be absorbed well, and the steering stability can be positively retained.

Then, by setting the thickness of the projection of the rim as mentioned above, even with the restricted width of the axle part of the wheel, and required length of the plate, the rigidity of the wheel can be kept above a predetermined value by selecting the opening angle of the plates. Further, the pair of plates cooperate with each other so that one plate is subjected to tension and the other is subjected to compression, the stress is distributed, the balance of forces on the right and left sides is kept even against external disturbances given to the steering handle, and steering stability is improved.

We claim:

1. A wheel for a vehicle, comprising:
   a wheel hub;
   a wheel rim having at least one projection on its inner surface;
   a plurality of pairs of plates which are mechanically and operably connected to said wheel hub and said rim projection;
   said wheel hub, said rim projection and each of said pairs of plates forming in a vertical cross-section a triangle having said rim projection at the apex of said triangle, the base of said triangle being formed by a portion of said wheel hub;
   each plate of said pairs of plates having fitting parts provided at spaced-apart edge portions on the end of said plate connected to said wheel hub; and
   said fitting parts being overlapped on the fitting parts of adjacent plates on both sides of each said plate, and firmly connected thereto.

2. A wheel according to claim 1, wherein:
   holes are respectively provided in said fitting parts on the hub end of each said plate of said pairs of plates; and
   said overlapped fitting parts are rigidly connected by a fastening member provided through said holes.

3. A wheel according to claim 2, wherein:
   said fitting parts expand sidewise from both spaced-apart edge portions of each said plate of said pairs of plates, on the end thereof connected to said wheel hub.

4. A wheel according to claim 3, wherein:
   one of said fitting parts on the hub side is made to project in the direction of the wheel axle to form a stepped part and the other of said fitting parts is made to be flat.

5. A wheel according to claim 1, including:
   said rim projection is formed to be wide on the outer peripheral side and narrow on the inner peripheral side so as to be in the form of a trapezoid in cross-section; and
   a fitting part on the rim side of said each plate is bent outwardly to be in conformity with each tapered side surfaces of said rim projection.

6. A wheel according to claim 5, including:
   a tip of said fitting part on said rim side is bent outwardly to be in contact with the inside surface of said rim.

7. A wheel according to claim 1, wherein:
   each said plate of said pairs of plates is provided at each end in the lengthwise direction thereof which extends between said hub and said rim with two fitting holes separated from each other in the width direction of each said plate, and is connected to said wheel hub and said rim projection by inserting shaft-shaped fastening members, through said fitting holes; and
   one of said fitting holes in each said plate of said pairs of of plates is made to be a positioning hole to tightly fit said fastening members and the other holes are made to be holes loosely fitting said fastening members.

8. A wheel according to claim 7, wherein:
   one of the fitting holes in the hub end of each said plate of said pairs of plates is made said positioning hole.

9. A wheel according to claim 7, wherein:
   the center line of each said plate of said pairs of plates in the vertical cross-section is intersected at the intersection of the axis of said fastening member with the side surface of said rim projection on which side each said plate is disposed.

10. A wheel according to claim 9, wherein:
    an end part of each said plate of said pairs of plates, having fitting holes to be connected to said rim projection, is pressed out toward said rim projection so as to be in conformity therewith.

11. A wheel according to claim 5, wherein:
    said fitting part on the rim side of each said plate of said pairs of plates is connected to said tapered surface of said rim projection through fastening members by providing a washer having a tapered surface so that a fitting seat surface vertical to the wheel axel is provided.

12. A wheel according to claim 11, wherein:
    said washer is provided on said fitting part of each said plates of said pairs of plates; and
    each said plate of said pairs of plates contacts said rim projection directly.

13. A wheel according to claim 11, wherein:
    said washer is provided on said tapered surface of said rim projection; and each said plate of said pairs of plates is overlapped and fastened from outside on said washer.

14. A wheel according to claim 2, wherein: an exposed outside surface of said fastening member is protected with a cover.

15. A wheel according to claim 2, wherein: each said plate of said pairs of plates is provided at both sides with flanges bent inwardly.

* * * * *